United States Patent
Bickford et al.

(10) Patent No.: US 9,852,259 B2
(45) Date of Patent: Dec. 26, 2017

(54) AREA AND/OR POWER OPTIMIZATION THROUGH POST-LAYOUT MODIFICATION OF INTEGRATED CIRCUIT (IC) DESIGN BLOCKS

(71) Applicant: GLOBALFOUNDRIES INC., Grand Cayman (KY)

(72) Inventors: Jeanne P. Bickford, Essex Junction, VT (US); Alok Chandra, Bangalore (IN); Anand Kumaraswamy, Bangalore (IN); Sandeep Prajapati, Bangalore (IN); Venkatasreekanth Prudvi, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/002,550

(22) Filed: Jan. 21, 2016

(65) Prior Publication Data
US 2017/0212977 A1    Jul. 27, 2017

(51) Int. Cl.
*G06F 9/455* (2006.01)
*G06F 17/50* (2006.01)

(52) U.S. Cl.
CPC ...... *G06F 17/5081* (2013.01); *G06F 17/5072* (2013.01); *G06F 17/5077* (2013.01); *G06F 2217/78* (2013.01)

(58) Field of Classification Search
USPC ........................................................ 716/134
See application file for complete search history.

(56) References Cited

U.S. PATENT DOCUMENTS

| 8,930,863 B2 | 1/2015 | Nayak et al. |
| 8,966,415 B2 | 2/2015 | McElvain et al. |
| 2015/0015306 A1* | 1/2015 | Jarrar ................ H03K 19/094 326/102 |
| 2015/0347655 A1* | 12/2015 | Grinshpon .......... G06F 17/5068 716/134 |

* cited by examiner

*Primary Examiner* — Eric Lee
(74) *Attorney, Agent, or Firm* — Gibb & Riley, LLC; David A. Cain, Esq.

(57) ABSTRACT

Disclosed are integrated circuit (IC) design methods, systems and computer program products that provide for area and/or power optimization through post-layout modification of design blocks. Specifically, a layout for an initial IC design is accessed. This initial IC design incorporates multiple instances of the same design block. Each instance includes a primary input connected to top-level logic for receiving a signal and one or more modifiable periphery sections. A timing analysis is performed to close timing and determine arrival times of the signal at the primary inputs of all instances of the design block, respectively, given the layout. The arrival times are then compared to a preselected threshold arrival time and the modifiable periphery section (s) of any specific instance of the design block having an arrival time that is equal to or less than the preselected threshold arrival time is selectively modified in order to generate an area and/or power optimized integrated circuit design.

14 Claims, 9 Drawing Sheets

AREA AND/OR POWER OPTIMIZATION THROUGH POST-LAYOUT MODIFICATION OF INTEGRATED CIRCUIT (IC) DESIGN BLOCKS

FIELD OF THE INVENTION

The present invention relates to integrated circuits (ICs) and, more particularly, to IC design methods, systems and computer program products that provide for area and/or power optimization through post-layout modification of design blocks.

BACKGROUND

In integrated circuit (IC) design, static timing analysis (STA) is used to predict the performance of an IC and to verify that the IC, as designed, will function correctly. Specifically, STA is used to predict the arrival times (ATs) of clock and data signals and the results can be compared against established timing requirements (e.g., required arrival times (RATs)) to see if the integrated circuit will function properly with a sufficiently high probability. As IC designs become more and more complex, performing STA on the top-level design (also referred to herein as the full design) of an IC is no longer a viable option due to the large runtime and memory requirements for completing the analysis. Consequently, IC designers have turned to a hierarchical approach to designing ICs and performing STA. With a hierarchical approach to design, multiple different design blocks are developed, STAs are performed on the design blocks and, based on the results of the STAs, timing abstracts for the different design blocks are generated. A timing abstract for a specific design block only contains relevant timing information required for interfacing with other design blocks at a higher level of hierarchy or in the top-level design and, particularly, periphery timing information and does not include internal timing information. In any case, during design, an IC designer will select design blocks and, then, interconnect the selected design blocks with top-level logic. Typically, the resulting top-level design will include multiple instances of the exact same design block at different locations within the IC. The timing abstracts for the selected design blocks are subsequently used to analyze an overall timing model for the full top-level design, thereby reducing the runtime and memory requirements for completing the analysis. Although this hierarchical approach has its advantages, the use of the multiple instances of the same design block requires that the block be designed to meet the highest performance requirements which can result in more performance than needed in areas that do not require as much performance. This results in more power and area consumption than in the case where hierarchical blocks are not used.

SUMMARY

In view of the foregoing, disclosed herein are integrated circuit (IC) design methods, systems and computer program products that provide for area and/or power optimization through post-layout modification of design blocks. Specifically, a layout for an initial IC design can be accessed from a memory and a timing analysis of the initial IC design can be performed in order to close timing. As a part of closing timing, arrival times (ATs) of a data signal at the primary inputs of multiple instances of the same design block at different locations within the layout can be determined. The ATs can be compared to a preselected threshold arrival time and modifications can be made to modifiable periphery section(s) within any instance of the design block having an AT that is equal to or less than the preselected threshold arrival time in order to reduce the power consumption and/or area of the modifiable periphery section(s). This technique allows area and power recovery to be achieved without requiring additional timing analyses to be performed.

More particularly, disclosed herein is an integrated circuit (IC) design method that provides for area and/or power optimization through post-layout modification of design blocks. The method can include storing, in memory, a layout for an initial IC design. This initial IC design can have multiple instances of the same design block, wherein each instance incorporates at least one modifiable periphery section and a primary input connected to top-level logic for receiving a data signal. The layout of the initial IC design can subsequently be accessed (e.g., by a processor in communication with the memory) and a timing analysis of the initial IC design can be performed (e.g., by the processor). The timing analysis can be performed in order to close timing on the initial IC design and can include, but is not limited to, determining the arrival times (ATs) of the data signal at the primary inputs of all of the multiple instances of the design block, respectively. The method can further include comparing (e.g., by the processor) the ATs to a preselected threshold arrival time and modifying (e.g., by the processor) any one or more of the modifiable periphery section(s) of each specific instance of the design block having an AT that is equal to or less than the preselected threshold arrival time. This modification process can specifically be performed so to reduce power consumption by the specific instance of the design block and/or to reduce an area of the specific instance of the design block. An updated IC design and, more particularly, an area and/or power optimized IC design can then be generated and stored in memory.

Also disclosed herein is an integrated circuit (IC) design system that provides for area and/or power optimization through post-layout modification of design blocks. The system can include a memory and at least one processor in communication with the memory. The memory can store a layout for an initial IC design. This initial IC design can have multiple instances of the same design block, wherein each instance incorporates at least one modifiable periphery section and a primary input connected to top-level logic for receiving a data signal. The processor can access the layout of the initial IC design from memory and can perform a timing analysis of the initial IC design. The timing analysis can be performed by the processor in order to close timing on the initial IC design and can include, but is not limited to, determining the arrival times (ATs) of the data signal at the primary inputs of all of the multiple instances of the design block, respectively. The processor can further compare the ATs to a preselected threshold arrival time and can modify any one or more of the modifiable periphery section(s) of each specific instance of the design block having an AT that is equal to or less than the preselected threshold arrival time. The processor can specifically modify the modifiable periphery section(s) so as to reduce power consumption by the specific instance of the design block and/or to reduce an area of the specific instance of the design block. The processor can then generate an updated IC design and, more particularly, an area and/or power optimized IC design and store that updated IC design in memory.

Also disclosed herein is a computer program product for IC design. The computer program product can be a computer readable storage medium. This computer readable storage medium can store program instructions, which are executable by a processor to cause the processor to perform the above-described method.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
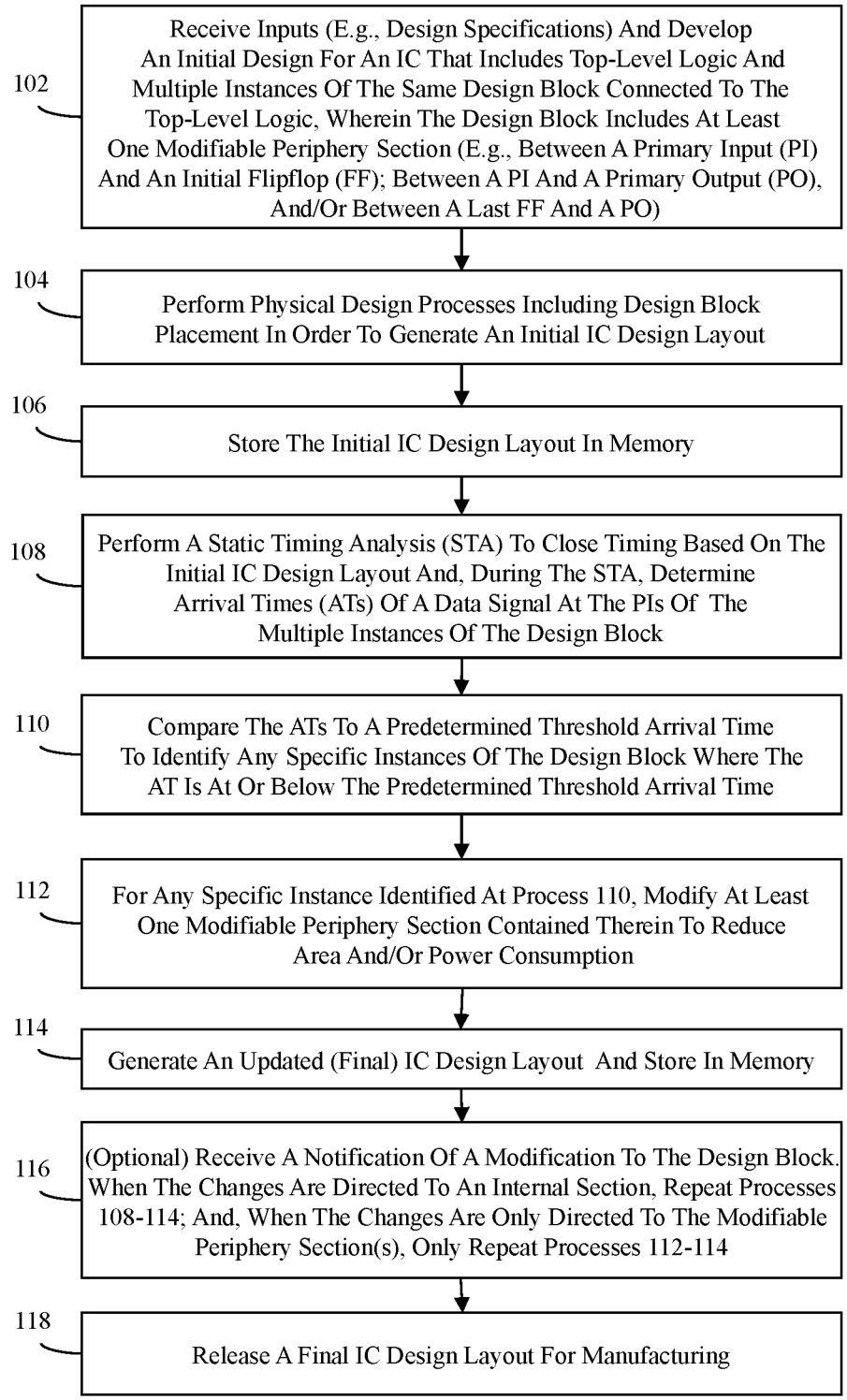
FIG. 1 is a flow diagram illustrating an integrated circuit (IC) design method that provides for area and/or power optimization through post-layout modification of design blocks.

As mentioned above, in integrated circuit (IC) design, static timing analysis (STA) is used to predict the performance of an IC and to verify that the IC, as designed, will function correctly. Specifically, STA is used to predict the arrival times (ATs) of clock and data signals and the results can be compared against established timing requirements (e.g., required arrival times (RATs)) to see if the integrated circuit will function properly with a sufficiently high probability. As IC designs become more and more complex, performing STA on the top-level design (also referred to herein as the full design) of an IC is no longer a viable option due to the large runtime and memory requirements for completing the analysis. Consequently, IC designers have turned to a hierarchical approach to designing ICs and performing STA. With a hierarchical approach to design, multiple different design blocks are developed, STAs are performed on the design blocks and, based on the results of the STAs, timing abstracts for the different design blocks are generated. A timing abstract for a specific design block only contains relevant timing information required for interfacing with other design blocks at a higher level of hierarchy or in the top-level design and, particularly, periphery timing information and does not include internal timing information. In any case, during design, an IC designer will select design blocks and, then, interconnect the selected design blocks with top-level logic. Typically, the resulting top-level design will include multiple instances of the exact same design block at different locations within the IC. The timing abstracts for the selected design blocks are subsequently used to analyze an overall timing model for the full top-level design, thereby reducing the runtime and memory requirements for completing the analysis. Although this hierarchical approach has its advantages, the use of the multiple instances of the same design block requires that the block be designed to meet the highest performance requirements which can result in more performance than needed in areas that do not require as much performance. This results in more power and area consumption than in the case where hierarchical blocks are not used.

In view of the foregoing, disclosed herein are integrated circuit (IC) design methods, systems and computer program products that provide for area and/or power optimization through post-layout modification of design blocks. Specifically, a layout for an initial IC design can be accessed from a memory and a timing analysis of the initial IC design can be performed in order to close timing. As a part of closing timing, ATs of a data signal at the primary inputs of multiple instances of the same design block at different locations within the layout can be determined. The ATs can be compared to a preselected threshold arrival time and modifications can be made to modifiable periphery section(s) within any instance of the design block having an AT that is equal to or less than the preselected threshold arrival time in order to reduce the power consumption and/or area of the modifiable periphery section(s). This technique allows area and power recovery to be achieved without requiring additional timing analyses to be performed.

More particularly, referring to the flow diagram of FIG. 1, disclosed herein is an integrated circuit (IC) design method that provides for area and/or power optimization through post-layout modification of design blocks. The method can be implemented using design information, for example, in the form of a process design kit (PDK), which is stored in a memory and which is accessible by one or more processors of a computer-aided design (CAD) system a design system executing electronic design automation (EDA) tools for the purpose of designing an integrated circuit. The design information (e.g., the PDK) can include a set of foundry-specific files including, but not limited to, technology files for a specific technology node, a library, design rules, etc. The library can list multiple different design blocks and the library files (.libs) for those design blocks. For purposes of this disclosure, a design block (also referred to as a macro, a cell or a library element) is a group of devices or lower-level design blocks and the interconnect structure(s) that connect those devices or lower-level blocks. A design block can be configured to perform a logic function, a storage function (i.e., a memory function) or a processing function. The library files (.libs) can contain library information about the design blocs, respectively, and this library information can include, but is not limited to, the specific attributes of the design block (e.g., the transistors, interconnects, etc.), the pin characteristics (e.g., capacitance, timing, etc.) for the design block, the timing information for the design block (e.g., a timing abstract), and other design block-specific information. As mentioned above, a timing abstract for a design block is generated based on a block-level static timing analysis (STA) and contains relevant timing information required for incorporating that design block into a top-level design. That is, the timing abstract only contains periphery timing information that will impact adjacent hierarchical entities within the design (i.e., that will impact other hierarchical entities that interface with the specific hierarchical entity in the design) and does not include internal timing information. In any case, at least one design block in the library can include at least one modifiable periphery section, as discussed in greater detail below.

In the method, design inputs and, particularly, design and performance specifications for an IC can be received (e.g., by a processor) and used to develop an initial IC design (102). Specifically, design inputs can be received from an IC designer via a graphic user interface (GUI) and stored in memory (e.g., on a data storage device accessible by the processor). Given these design inputs, design blocks from the library can be selected and, then, interconnected with top-level logic (e.g., by the IC designer using GUI or automatically by the processor). This initial IC design can then be stored in memory. It should be noted that the method disclosed herein is applied to a case wherein multiple instances of the same design block are selected for use in the initial IC design. In this case, the initial IC design can include, but is not limited to, top-level logic and multiple instances of the same design block, wherein each instance of that design block has a primary input connected to the top-level logic by a corresponding data signal pathway for receiving a data signal and wherein each design block has at least one modifiable periphery section (as discussed in greater detail below).

Following development of the initial IC design, various physical design processes can be performed (e.g., by the processor) (104). These physical design processes can include, but are not limited to, floorplanning, power planning, input/output pin placement, design block placement, clock tree synthesis and wire routing. The above-described physical design processes are well known in the art and, thus, a detailed description of these physical design processes is omitted from this specification in order to allow the reader to focus on the salient aspects of the disclosed method. It should be noted that the physical design processes can be performed (e.g., by the processor) based on design rules set forth in the PDK. The design rules can include rule decks, also referred to as sets of rules or run sets, for one or more of the particular processes in the design flow (e.g., a floorplanning rule deck, a power planning rule deck, an input/output pin placement rule deck, a block placement deck, a clock planning rule deck, and a wire routing rule deck). Techniques for performing the above-described physical design processes using such rule decks are well known in the art and, thus, the details of such techniques are omitted from this specification in order to allow the reader to focus on the salient aspects of the disclosed method. In any case, performance of wire routing essentially completes the initial IC design layout. That is, based on the results of the physical design processes described above, a layout for the initial IC design can be generated and stored in memory (104)-(106).

Figure 2:
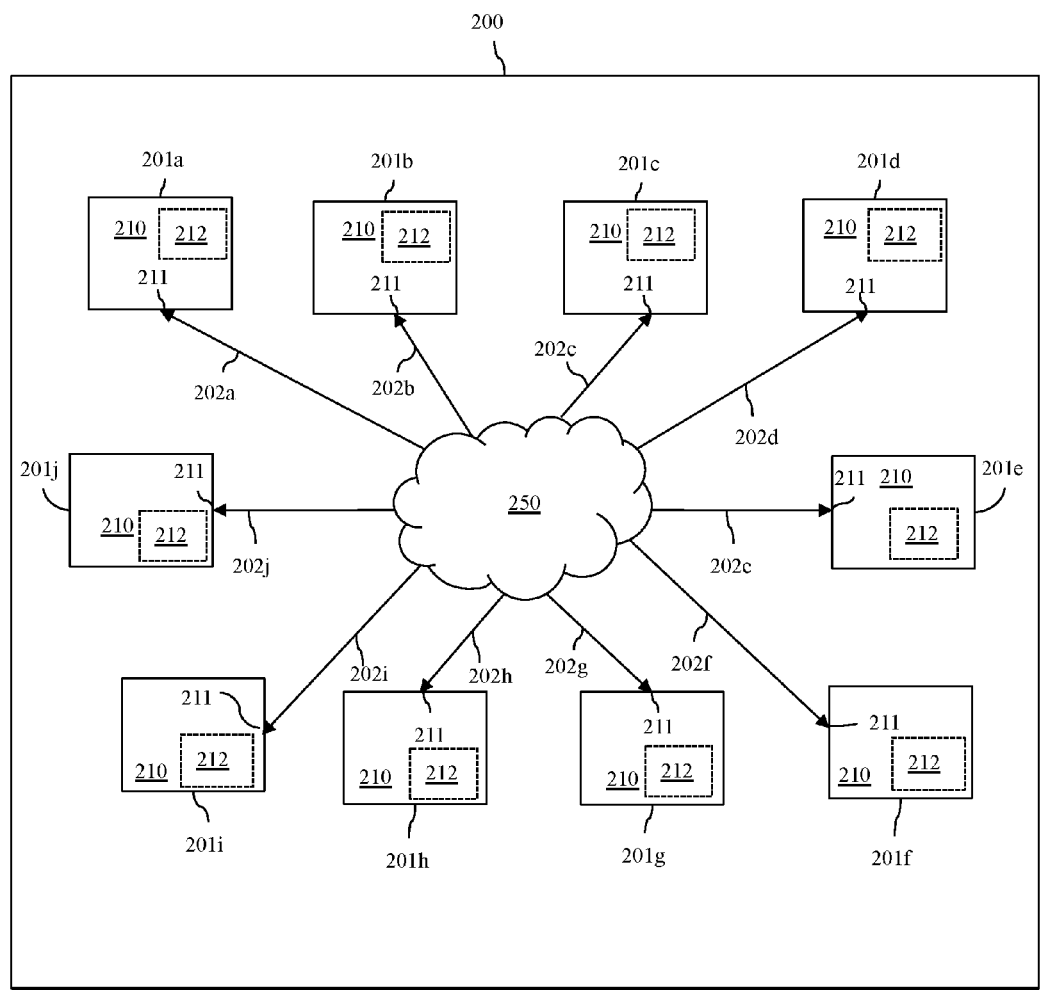
FIG. 2 is a schematic drawing illustrating an initial IC design layout including multiple instances of the same design block.

FIG. 2 is a drawing illustrating a layout of an exemplary initial design of an IC 200. This IC 200 includes, but is not limited to, top-level logic 250 connected via data signal pathways 202a-j to the primary inputs 211 of multiple instances 201a-j of the same design block 210 placed at different locations across the IC 200. The data signal pathways 202a-j allow a data signal from the top-level logic 250 to be received at the primary input 211 of each instance of the design block. Each instance of the design block 210 includes at least one modifiable periphery section 212. This modifiable periphery section 212 remains unmodified in the initial IC design layout such that each instance of the design block 210 is essentially identical. That is, each instance of the design block 210 has the same devices or lower-level design blocks and the same interconnect structure(s) (including the same device(s) or lower-level design block(s) and the same interconnect structure(s) within the modifiable periphery section(s) 212). It should be noted that, due to the different locations of the different instances 201a-j of the design block 210, the data signal pathways 202a-j between the top-level logic 250 and the primary inputs 211 may vary (e.g., may be different lengths, may incorporate different numbers or sizes of buffers, etc.).

Figure 3A:
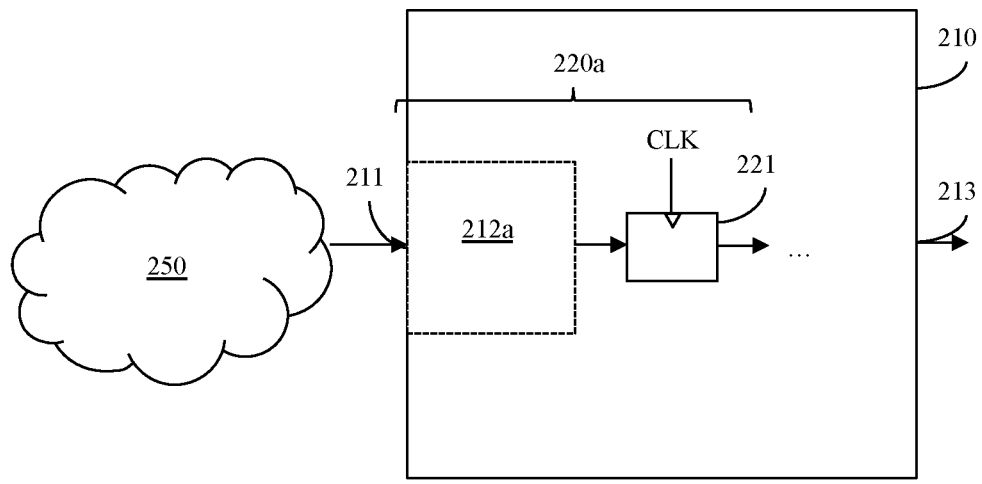
FIG. 3A is a schematic drawing illustrating a possible location of a modifiable periphery section within the design block.
Figure 3B:
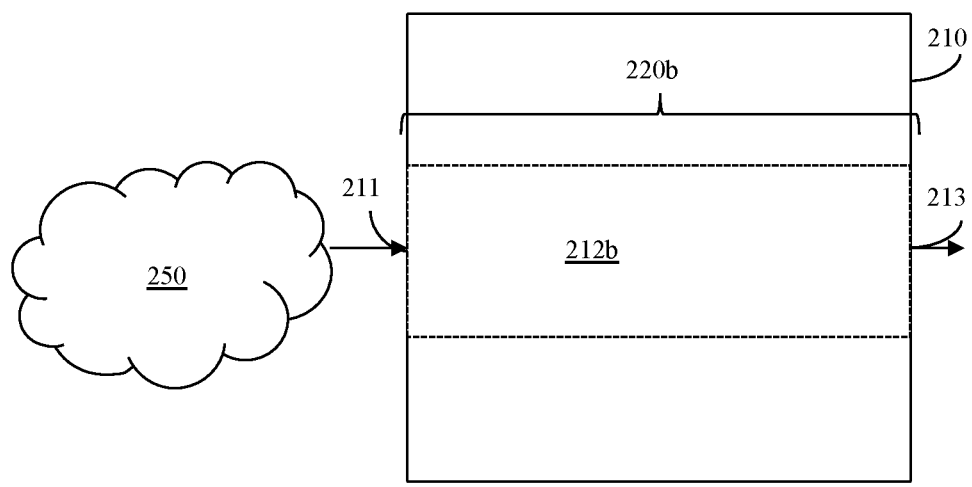
FIG. 3B is a schematic drawing illustrating another possible location of a modifiable periphery section within the design block.
Figure 3C:
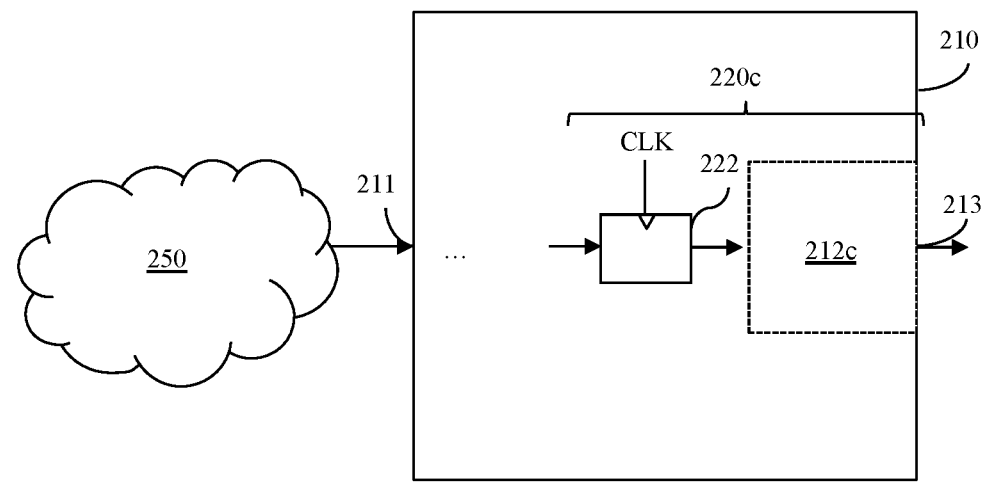
FIG. 3C is a schematic drawing illustrating yet another possible location of a modifiable periphery section within the design block.
Figure 3D:
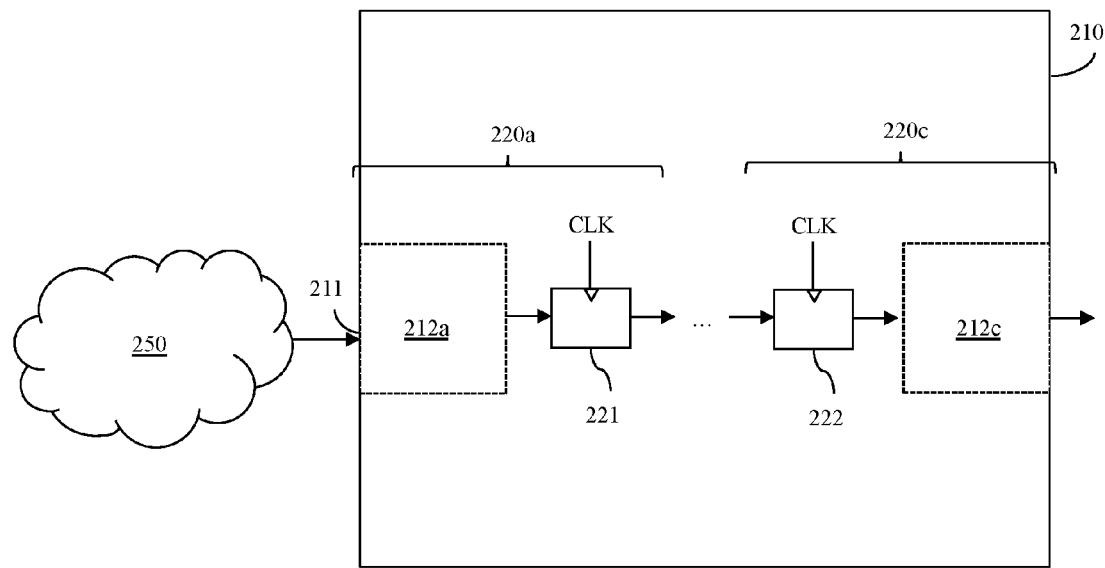
FIG. 3D is a schematic drawing illustrating multiple modifiable periphery sections at different locations within the design block.

For purposes of this disclosure, a modifiable periphery section (also referred to herein as a reconfigurable periphery section) is a section of logic in the design block that is adjacent to the periphery of the design block such that it encompasses a primary input, a primary output, or both, as discussed below and illustrated in FIG. 3A-3D. Specifically, FIG. 3A illustrates a possible location within the design block 210 of a modifiable periphery section 212a. This modifiable periphery section 212a extends between and, particularly, includes a data signal pathway 220a that extends between a primary input 211 of the design block 210 and an initial flipflop 221. The initial flipflop 221 is the first flipflop in the data signal pathway 220a to receive a data signal after it arrives at the primary input 211. FIG. 3B illustrates another possible location within a design block 210 of a modifiable periphery section 212b. This modifiable periphery section 212b extends between and, particularly, includes a data signal pathway 220b that extends between a primary input 211 of the design block 210 and a primary output 213 and that does not include any flipflops (i.e., that is devoid of flipflops). FIG. 3C illustrates yet another possible location with the design block 210 of a modifiable periphery section 212c. This modifiable periphery section 212c extends between and, particularly, includes a data signal pathway 220c that extends between a last flipflop 222 and a primary output 213. The last flipflop 222 is the final flipflop in the data signal pathway 220c to receive a data signal before it passes to the primary output 213 of the design block 210. As mentioned above, the design block 210 can, optionally, include multiple modifiable periphery sections. Thus, for example, FIG. 3D illustrates the design block 210 containing two different modifiable periphery sections, including the modifiable periphery section 212a and the modifiable periphery section 212c, at different locations.

Figure 4:
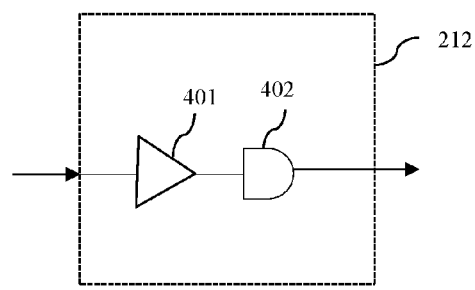
FIG. 4 is a schematic diagram illustrating the configuration of an exemplary modifiable periphery section that can be incorporated into the design block.

In any case, the modifiable periphery section 212 can contain one or more logic devices connected in series. These logic devices can include, but are not limited to, any one or more of the following: buffer(s), inverter(s) and logic gate(s) (e.g., AND gate(s), OR gate(s), NOT gate(s), etc.). FIG. 4 illustrates the configuration of exemplary modifiable periphery section 212 that can be incorporated into a design block, as described above. This exemplary modifiable periphery section 212 contains a buffer 401 connected in series to an AND gate 402. It should be understood that the number and types of logic devices shown in FIG. 4 are not intended to be limiting and that a modifiable periphery section can contain any number of one or more of any of the logic devices discussed above.

The layout of the initial IC design, the previously generated and stored timing abstract for the design block and other timing information associated with the top-level logic can be accessed and a timing analysis of the initial IC design can be performed (e.g., by the processor) (108). Specifically, a static timing analysis (STA), such as a statistical static timing analysis (SSTA), can be performed using both the previously generated timing abstract for the design block and other timing information associated with the top-level logic in order to close timing on the initial IC design given the layout. This STA can specifically be used to determine (i.e., to predict) the arrival times (ATs) of the data signals at the primary inputs of the design blocks and the results can be compared against established timing requirements (e.g., required arrival times (RATs)) to see if the integrated circuit, as initially designed, will function properly with a sufficiently high probability. As mentioned above with regard to the layout of the exemplary layout of the design of the IC 200 shown in FIG. 2, due to the different locations of the different instances 201a-j of the design block 210, the data signal pathways 202a-j between the top-level logic 250 and the primary inputs 211 may vary (e.g., may be different lengths, may incorporate different numbers or sizes of buffers, etc.). As a result, the ATs at the primary inputs 211 of the different instances 201a-j of the design block are different and, thereby the slack times will vary.

Figure 5:
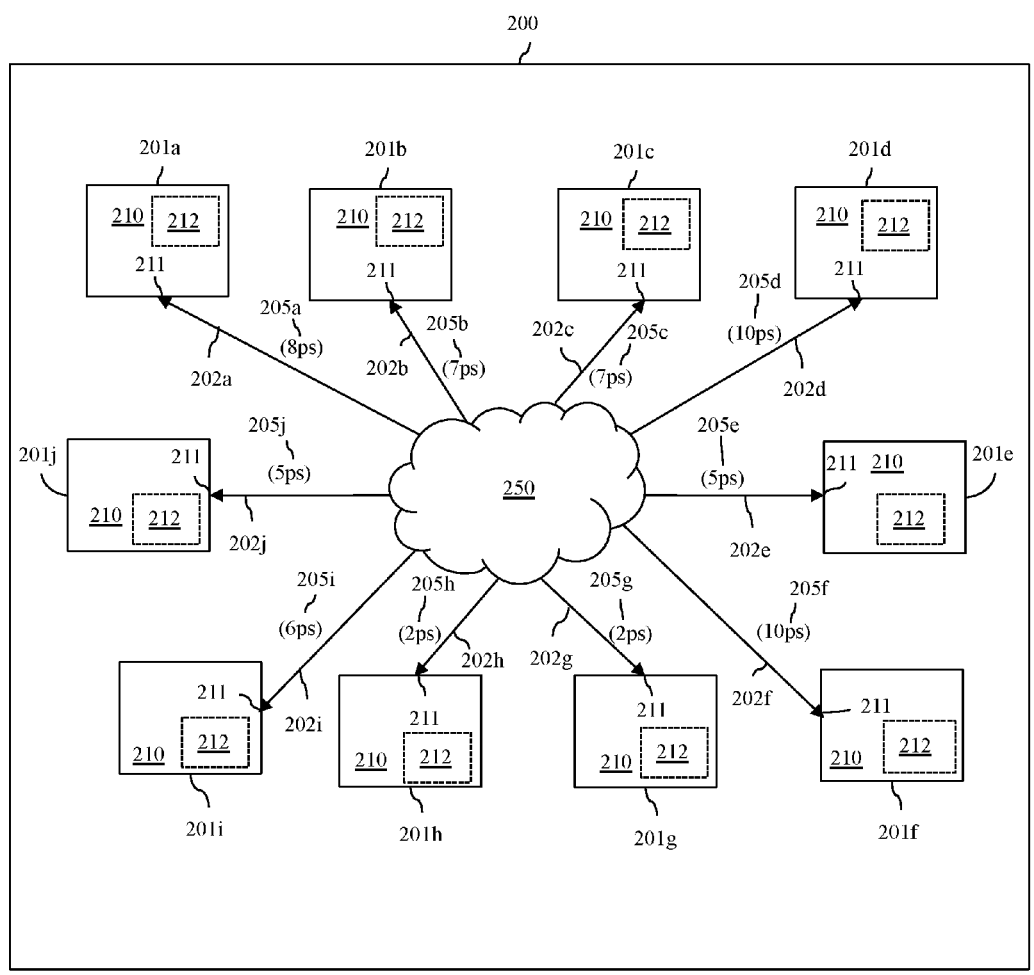
FIG. 5 is a schematic drawing illustrating the initial IC design layout of FIG. 2 annotated with arrival times associated each of the different instances of the design block.

For example, FIG. 5 shows the layout of the initial design of the IC 200 annotated with results of the timing analysis of process 108 and, particularly, annotated with the ATs 205a-j associated with each of the different instances 201a-j of the design block 210. These ATs 205a-j range from an earliest AT of 2 picoseconds (ps) (e.g., for the instances 201g and 201h of the design block 210) to a latest AT of 10 ps (e.g., for instances 201d and 201f of the design block). Corresponding slack times, thus, range from Bps (e.g., for the instances 201g and 201h of the design block 210) and 0 ps (e.g., for the instances 201d and 201f of the design block 210).

The method disclosed herein takes advantage of the earlier ATs at some of the design blocks and, thereby the greater slack times, in order to recover area and/or power without having to reclose timing. Specifically, the method can further include comparing (e.g., by the processor) the ATs associated with the multiple instances of the design block to a preselected threshold arrival time (110) and modifying (e.g., by the processor) any one or more of the modifiable periphery section(s) of each specific instance of the design block having an AT that is equal to or less than the preselected threshold arrival time (112). Specifically, at process 112, the modifiable periphery section of a specific instance of the design block, which is usually invisible during top-level design, is made visible so that modifications can be made to that modifiable periphery section in order to reduce power consumption by the specific instance of the design block and/or to reduce the area of the chip taken up by the specific instance of the design block. The process of modifying a modifiable periphery section of a specific instance of a design block within the initial IC design can include, but is not limited to, performing any one or more of the following: bypassing (i.e., removing) a device or devices (e.g., buffer(s), a pair of inverters, etc.) within the modifiable periphery section to both decrease power consumption and area; changing (e.g., increasing) the threshold voltage type of a device or devices within the modifiable periphery section to reduce leakage and, thereby reduce power consumption; changing drive strength of a device or devices within the modifiable periphery section to reduce current consumed which reduces power consumption; and, restructuring a device or devices within the modifiable periphery section to decrease power consumption or area (e.g., by changing the size/type of transistors to reduce leakage and, thereby decrease power consumption).

Figure 6A:
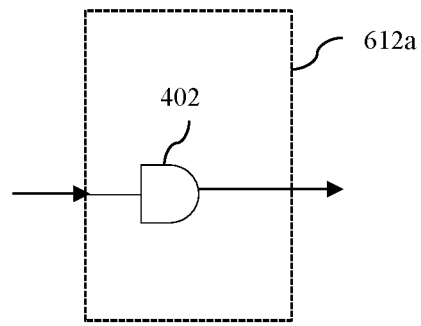
FIG. 6A is a schematic diagram illustrating an exemplary modified periphery section wherein a buffer is bypassed.
Figure 6B:
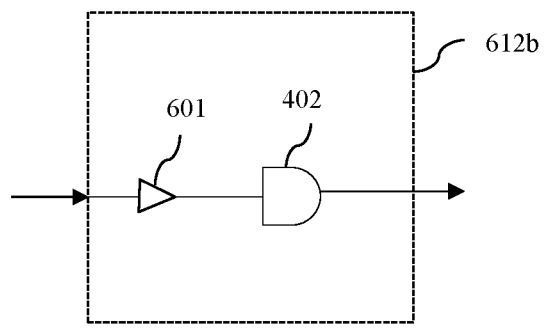
FIG. 6B is a schematic diagram illustrating another exemplary modified periphery section wherein a buffer is replaced.
Figure 6C:
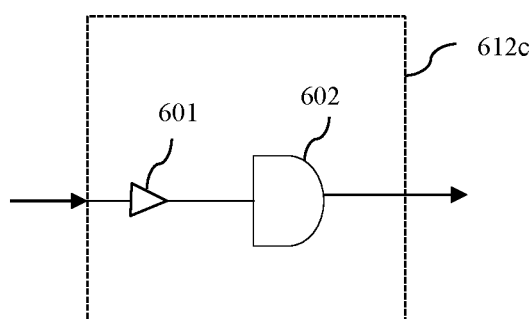
FIG. 6C is a schematic diagram illustrating yet another exemplary modified periphery section wherein a buffer and a logic gate are replaced.

Thus, for example, the exemplary modifiable periphery section 212 of FIG. 4, as described in detail above, could be modified, as shown in the modified periphery section 612a of FIG. 6A, to bypass the buffer 401 (i.e., to eliminate the buffer 401). Alternatively, the exemplary modifiable periphery section 212 of FIG. 4, as described in detail above, could be modified, as shown in the modified periphery section 612b of FIG. 6B, to replace the buffer 401 with a smaller buffer 601. Alternatively, the exemplary modifiable periphery section 212 of FIG. 4, as described in detail above, could be modified, as shown in the modified periphery section 612c of FIG. 6C, to replace the buffer 401 with a smaller buffer 601 and to also replace the AND gate 402 with a different AND gate 602. FIGS. 6A-6C are provided for illustration purposes only and are not intended to be limiting. It should be understood that any of the modification processes mentioned above could, additionally or alternatively, be used to modify the modifiable periphery section 212 of FIG. 4 in order to reduce the power and/or area of a specific instance of the design block and that different changes may be made to the modifiable periphery sections of different instances of the design block.

It should be noted that the preselected threshold arrival time can be selected as some optimal arrival time given the configuration of the modifiable periphery section(s) of the design block and its/their potential for power and/or area recovery. For example, if the modifiable periphery section is relatively small (i.e., includes a small number of devices) so that only a limited number of modifications could be made to that section to provide only a limited amount of power and/or area recovery, then the predetermined threshold arrival time will be relatively early (e.g., closer to the earliest possible AT). However, if the modifiable periphery portion is relatively large (i.e., includes a large number of devices) so that various modifications could be made to that section to provide a significant amount of power and/or area recovery, then the predetermined threshold arrival time will be relatively late (e.g., closer to the latest possible AT).

Once the modifications are made at process 112, an updated IC design layout and, more particularly, an area and/or power optimized IC design layout can be generated and stored in memory (114).

Figure 7:
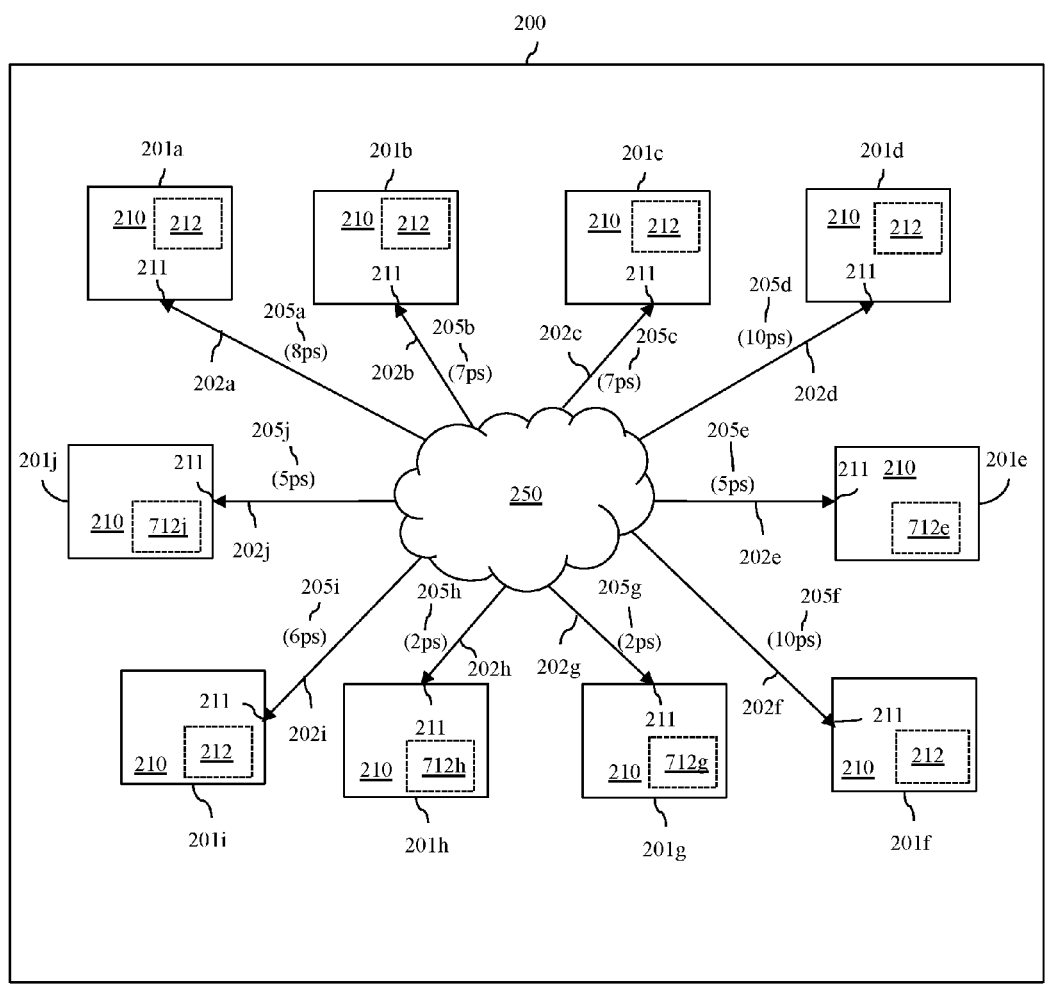
FIG. 7 is a schematic drawing illustrating an updated IC design layout following modification of modifiable periphery sections in some of instances of a design block.

FIG. 7 is a drawing illustrating a layout of an exemplary updated design of the integrated circuit 200 following modification of modifiable periphery sections in some of the instances of the design block 210. Specifically, the modifiable periphery sections of each specific instance of the design block having an AT that was determined to be equal to or less than a preselected threshold arrival time of 5 ps were modified. That is, the modifiable periphery sections of the instances 201e, 201g, 201h and 201j of the design block 210, which had ATs of 5 ps, 2 ps, 2 ps and 5 ps, respectively, were modified such that these instances of the design block 210 now include modified periphery sections 712e, 712g, 712h and 712j, respectively. Since, as mentioned above, different changes may be made to the modifiable periphery sections of different instances of the design block, sections 712e, 712g, 712h and 712j will be different from the modifiable periphery section 212 remaining unmodified in the instances of the design block having ATs above 5 ps and possible different from each other.

It should be noted that, oftentimes, during technology development, modifications will be made to a design block in the library. In this case, a notification of a modification to a design block (also referred to as an Engineering Change Order (ECO)) may be received and processed (e.g., by the processor) (116). Specifically, when a notification of a modification to a design block is received, the design block modification can be analyzed (e.g., by the processor) to determine whether it applies to the design block included in the IC design and, if so, whether the modification contains change(s) to an internal section of that design block or only contains change(s) to the modifiable periphery section(s) of that design block. If change(s) have been made to an internal section of the design block, thereby requiring a change in the timing abstract, processes 108-114 can be repeated using an updated timing abstract during the timing analysis. However, if the modification to the design block only contains change(s) to the modifiable periphery section(s), then the timing analysis previously performed at process 108 does not need to be repeated. Instead any modifications previously made at process 112 to the modifiable periphery section(s) of any instance of the design block in the initial IC design layout must be reassessed in light of the ECO. That is, processes 112-114 must be repeated using the modified periphery section contained in the ECO.

When no other modifications to the IC design, including modifications to the design block, are deemed necessary, a final IC design layout can be stored in memory and subsequently released for manufacturing (118).

Figure 8:
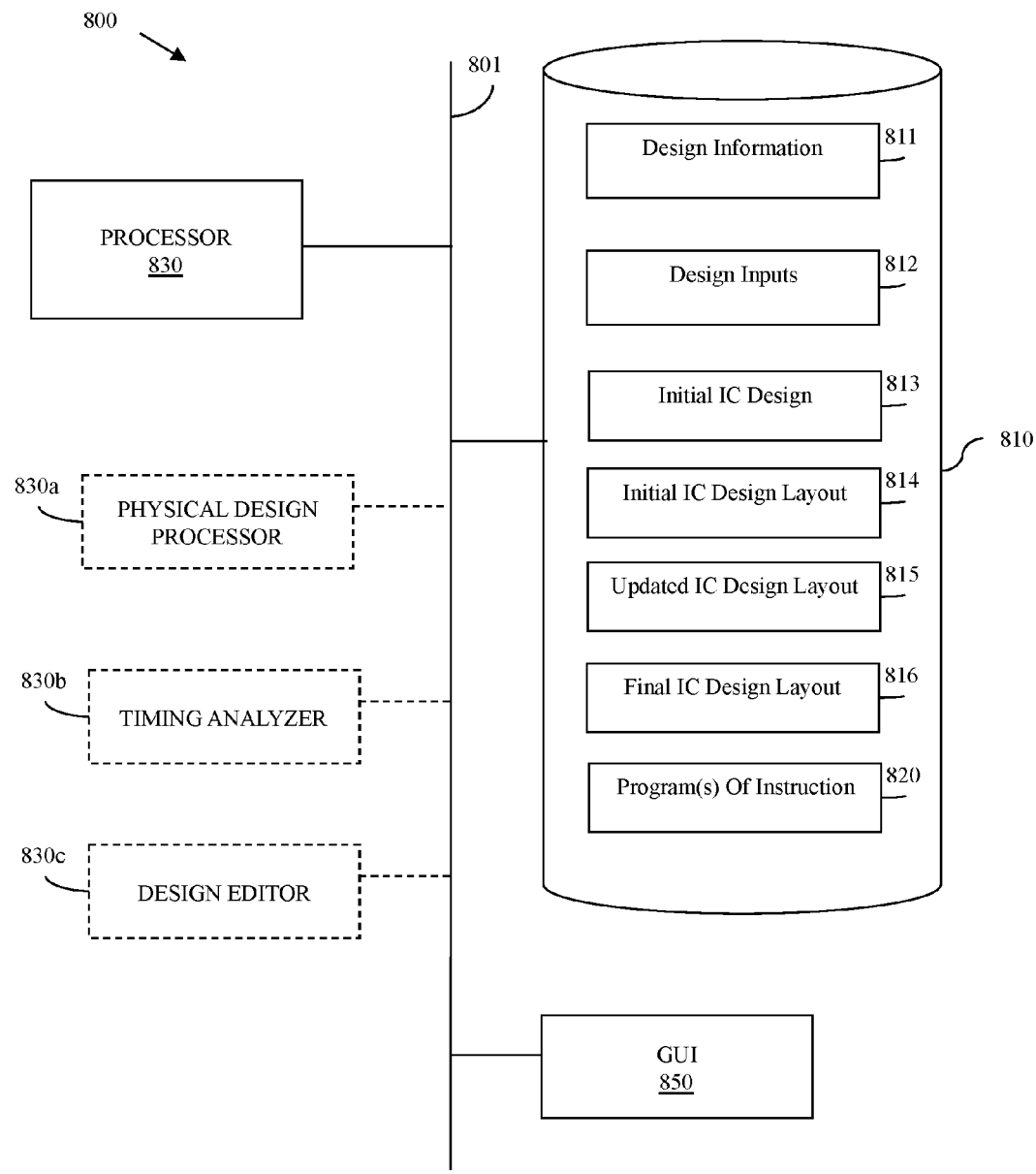
FIG. 8 is a schematic diagram illustrating an integrated circuit (IC) design system that provides for area and/or power optimization through post-layout modification of design blocks; and, FIG. 9 is a schematic diagram illustrating an exemplary hardware environment for implementing the methods and systems disclosed herein.

Referring to FIG. 8, also disclosed herein is an integrated circuit (IC) design system that provides for area and/or power optimization through post-layout modification of design blocks. The system 800 can be a computer-aided design (CAD) system and, specifically, can incorporate at least one memory 810 (e.g., at least one computer readable storage medium, such as a computer readable storage device), a user interface 850 (e.g., a graphic user interface (GUI)) and at least one processor (e.g., 830 or 830a-c, see detailed discussion below). Components of the system 800, including the processor(s), memory(ies) and GUI, can be interconnected over a system bus 801, as illustrated. Alternatively, any one or more of the components of the system 800 can communicate with any other component over a wired or wireless network.

The memory 810 can store program(s) of instruction 820 (e.g., electronic design automation (EDA) tool(s)) for performing the various processes described in detail below. The memory 810 can further store design information 811. The design information 811 (e.g., the PDK) can, as discussed in greater detail above with regard to the method, include a set of foundry-specific files including, but not limited to, technology files for a specific technology node, a library, design rules, etc. The library can list multiple different design blocks and the library files (.libs) (including timing abstracts) for those design blocks.

As mentioned above, the system 800 can incorporate at least one processor. Specifically, the system 800 can incorporate a single specialized processor 830 (e.g., a single specialized computer processing unit) that, during IC design, performs (i.e., that is adapted to perform, that is configured to perform and/or that executes program(s) of instructions 820 to perform) multiple process steps, as described in detail below. Alternatively, the system 800 can incorporate multiple specialized processors 830a-c (e.g., multiple different specialized computer processing units) and, during IC design, each processor can perform (i.e., can be adapted to perform, can be configured to perform and/or can execute one or more specific programs of instructions 820 to perform) one or more of the multiple process steps, as described in detail below. For purposes of illustration, three different special purpose processor(s) referred to as tools are shown in FIG. 8 including a physical design processor 830a, a timing analyzer 830b and a design editor 830c. It should be understood that FIG. 8 is not intended to be limiting and, alternatively, the multiple process steps, as described in detail below, can be performed by any number of one or more processors.

The system 800 can receive design inputs 812 and, particularly, design and performance specifications for an IC and can use the design inputs to develop an initial IC design. These design inputs 812 can be received, for example, from an IC designer via the GUI 850 and stored in memory 810. Given these design inputs, the processor 830 (or, if applicable, the physical design processor 830a) can, either automatically or based on selections received from an IC designer through the GUI 850, select design blocks from the library and, then, interconnect the selected design blocks with top-level logic, thereby generating the initial IC design 813. This initial IC design 813 can then be stored in memory. It should be noted that the system 800 disclosed herein is applied to a case wherein multiple instances of the same design block are selected for use in the initial IC design 813. In this case, the initial IC design 813 can include, but is not limited to, top-level logic and multiple instances of the same design block, wherein each instance of that design block has a primary input connected to the top-level logic by a corresponding data signal pathway for receiving a data signal and wherein each design block has at least one modifiable periphery section (as discussed in greater detail below).

The processor 830 (or, if applicable, the physical design processor 830a) can perform (e.g., can be adapted to perform, can be configured to perform and/or can execute a program of instruction 820 to perform) various additional physical design processes. These physical design processes can include, but are not limited to, floorplanning, power planning, input/output pin placement, design block placement, clock tree synthesis and wire routing. The above-described physical design processes are well known in the art and, thus, a detailed description of these physical design processes is omitted from this specification in order to allow the reader to focus on the salient aspects of the disclosed method. Based on the results of the physical design processes described above, a processor 830 (or, if applicable, the physical design processor 830a) can generate an initial IC design layout 814 and can store that initial IC design layout 814 in memory 810.

FIG. 2 is a drawing illustrating a layout of an exemplary initial design of an IC 200. This IC 200 includes, but is not limited to, top-level logic 250 connected via data signal pathways 202a-j to the primary inputs 211 of multiple instances 201a-j of the same design block 210 placed at different locations across the IC 200. The data signal pathways 202a-j allow a data signal from the top-level logic 250 to be received at the primary input 211 of each instance of the design block. Each instance of the design block 210 includes at least one modifiable periphery section 212. This modifiable periphery section 212 remains unmodified in the initial IC design layout such that each instance of the design block 210 is essentially identical. That is, each instance of the design block 210 has the same devices or lower-level design blocks and the same interconnect structure(s) (including the same device(s) or lower-level design block(s) and the same interconnect structure(s) within the modifiable periphery section(s) 212). It should be noted that, due to the different locations of the different instances 201a-j of the design block 210, the data signal pathways 202a-j between the top-level logic 250 and the primary inputs 211 may vary (e.g., may be different lengths, may incorporate different numbers or sizes of buffers, etc.). For purposes of this disclosure, a modifiable periphery section (also referred to herein as a reconfigurable periphery section) is a section of logic in the design block that is adjacent to the periphery of the design block such that it encompasses a primary input, a primary output, or both, as discussed above and illustrated in FIG. 3A-3D. In any case, the modifiable periphery section 212 can contain one or more logic devices connected in series. These logic devices can include, but are not limited to, any one or more of the following: buffer(s), inverter(s) and logic gate(s) (e.g., AND gate(s), OR gate(s), NOT gate(s), etc.), as discussed above and illustrated in FIG. 4.

For illustration purposes, the additional processes performed by the system 800 will be described below with respect to FIGS. 1-4. Specifically, the processor 830 (or, if applicable, the timing analyzer 830b) can access the initial IC design layout 814, the previously generated and stored timing abstract for the design block 210 and other timing information associated with the top-level logic 250 and can perform (i.e., can be adapted to perform, can be configured to perform, and/or can execute a program of instructions 820 to perform) a timing analysis of the initial IC design. This timing analysis can be a static timing analysis (STA), such as a statistical static timing analysis (SSTA), which is performed using both the previously generated timing abstract for the design block 210 and other timing information associated with the top-level logic 250 in order to close timing on the initial IC design given the layout. This STA can specifically be used to determine (i.e., to predict) the arrival times (ATs) of the data signals at the primary inputs of the design blocks and the results can be compared against established timing requirements (e.g., required arrival times (RATs)) to see if the integrated circuit, as initially designed, will function properly with a sufficiently high probability. As mentioned above with regard to the layout of the exemplary layout of the design of the IC 200 shown in FIG. 2, due to the different locations of the different instances 201a-j of the design block 210, the data signal pathways 202a-j between the top-level logic 250 and the primary inputs 211 may vary (e.g., may be different lengths, may incorporate different numbers or sizes of buffers, etc.). As a result, the ATs at the primary inputs 211 of the different instances 201a-j of the design block are different and, thereby the slack times will vary. For example, see the detailed discussion of FIG. 5 above, which shows the layout of the initial design of the IC 200 annotated with the ATs 205a-j).

The system 800 disclosed herein takes advantage of the earlier ATs at some of the design blocks and, thereby the greater slack times, in order to recover area and/or power without having to reclose timing. Specifically, the processor 830 (or, if applicable, the design editor 830c) can compare (i.e., can be adapted to compare, can be configured to compare and/or can execute a program of instructions 820 to compare) the ATs associated with the multiple instances of the design block to a preselected threshold arrival time and can further modifying (e.g., can be adapted to modify, can be configured to modify, and/or can execute a program of instructions 820 to modify) any one or more of the modifiable periphery section(s) 212 of each specific instance of the design block 210 having an AT that is equal to or less than the preselected threshold arrival time. This modification process can specifically be performed so to reduce power consumption by the specific instance of the design block and/or to reduce an area of the specific instance of the design block. The process of modifying a modifiable periphery section of a specific instance of a design block within the initial IC design can include, but is not limited to, performing any one or more of the following: bypassing (i.e., removing) a device or devices (e.g., buffer(s), a pair of inverters, etc.) within the modifiable periphery section to both decrease power consumption and area; changing (e.g., increasing) the threshold voltage type (e.g., from a low threshold voltage (LVT) type or regular threshold voltage type (RVT) to a high threshold voltage (HVT) type or a super-high threshold voltage (SHVT) type, or any other such change where the threshold voltage type is increased) of a device or devices within the modifiable periphery section to reduce leakage and, thereby reduce power consumption; changing drive strength of a device or devices within the modifiable periphery section to reduce current consumed which reduces power consumption; and, restructuring a device or devices within the modifiable periphery section to decrease power consumption or area (e.g., by changing the size/type of transistors to reduce leakage and, thereby decrease power consumption).

For example, see the detailed discussion of FIGS. 6A-6C above, which show exemplary modified periphery sections 612a-612c, respectfully).

It should be noted that the preselected threshold arrival time can be selected as some optimal arrival time given the configuration of the modifiable periphery section(s) of the design block and its/their potential for power and/or area recovery. For example, if the modifiable periphery section is relatively small (i.e., includes a small number of devices) so that only a limited number of modifications could be made to that section to provide only a limited amount of power and/or area recovery, then the predetermined threshold arrival time will be relatively early (e.g., closer to the earliest possible AT). However, if the modifiable periphery portion is relatively large (i.e., includes a large number of devices) so that various modifications could be made to that section to provide a significant amount of power and/or area recovery, then the predetermined threshold arrival time will be relatively late (e.g., closer to the latest possible AT).

The processor 830 (or, if applicable, the design editor 830c) can, following these modifications, generate and store (i.e., can be adapted to generate and store in memory 810, can be configured to generate and store in memory 810 and/or can executed a program of instructions 820 to generate and store in memory 810) an updated IC design layout 815 and, more particularly, an area and/or power optimized IC design layout. For example, see the detailed discussion of FIG. 7 above, which shows a layout of an exemplary updated design of the integrated circuit 200 following modification of modifiable periphery sections in some of the instances of the design block 210.

It should be noted that, oftentimes, during technology development, modifications will be made to a design block in the library. In this case, a notification of a modification to a design block (also referred to as an Engineering Change Order (ECO)) may be received and processed by the system 800. Specifically, when a notification of a modification to a design block is received, the processor 830 (or, if applicable, the physical design processor 830*a*) can analyze (i.e., can be adapted to analyze, can be configured to analyze, and/or can execute a program of instructions 820 to analyze) the design block modification to determine whether it applies to the design block 210 included in the IC design and, if so, whether the modification contains change(s) to an internal section of that design block 210 or only contains change(s) to the modifiable periphery section(s) 212 of that design block 210. If change(s) have been made to an internal section of the design block 210, thereby requiring a change in the timing abstract, then the processor 830 (or, if applicable, the timing analyzer 830*b* and the design editor 830*c*) will repeat the above-described timing analysis and design modification processes. However, if the modification to the design block 210 only contains change(s) to the modifiable periphery section(s) 212, then the timing analysis previously performed by the processor 830 (or timing analyzer 830*b*) does not need to be repeated. Instead the processor 830 (or, if applicable, the design editor) can simply reassess (i.e., can be adapted to reassess, can be configured to reassess, and/or can execute a program of instructions 820 to reassess) any modifications previously made at to the modifiable periphery section(s) 212 of any instance of the design block 210 in the initial IC design layout 814 in light of the ECO.

When no other modifications to the IC design, including modifications to the design block, are deemed necessary, the processor 830 (or, if applicable, the design editor 830*c*) can generate and store in memory 810 (i.e., can be adapted to generate and store in memory 810, can be configured to generate and store in memory 810 and/or can execute a program of instructions 820 to generate and store in memory) a final IC design layout 816 that can be released for manufacturing.

Also disclosed herein is a computer program product for IC design. The computer program product can be a computer readable storage medium. This computer readable storage medium can store program instructions, which are executable by a processor to cause the processor to perform the above-described method. More specifically, the present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may incorporate copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
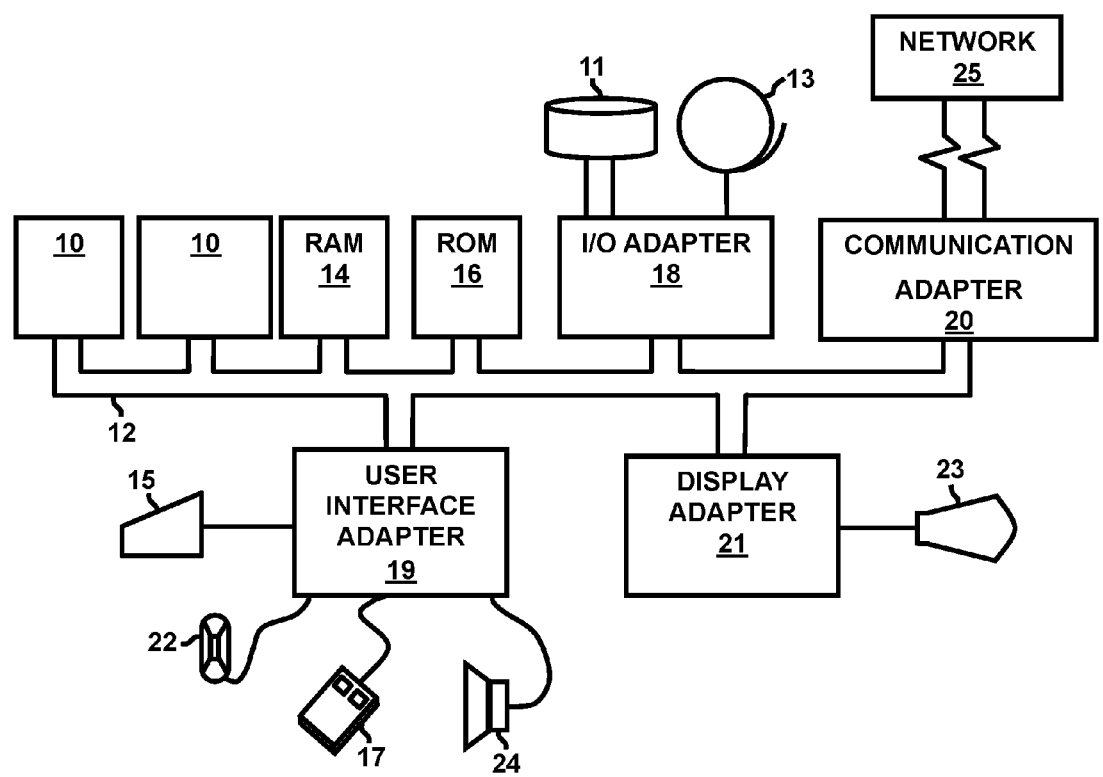

A representative hardware environment (i.e., a computer system) for implementing the methods, systems and computer program products disclosed above is depicted in FIG. 9. This schematic drawing illustrates a hardware configuration of an information handling/computer system in accordance with the embodiments herein. The system incorporates at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed method, systems and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are integrated circuit (IC) design methods, systems and computer program products that provide for area and/or power optimization through post-layout modification of design blocks. Specifically, a layout for an initial IC design can be accessed from a memory and a timing analysis of the initial IC design can be performed in order to close timing. As a part of closing timing, arrival times (ATs) of a data signal at the primary inputs of multiple instances of the same design block at different locations within the layout can be determined. The ATs can be compared to a preselected threshold arrival time and modifications can be made to modifiable periphery section(s) within any instance of the design block having an AT that is equal to or less than the preselected threshold arrival time in order to reduce the power consumption and/or area of the modifiable periphery section(s). This technique allows area and power recovery to be achieved without requiring additional timing analyses to be performed.

What is claimed is:
1. A method comprising:
  accessing, by a processor from a memory, an integrated circuit design comprising multiple instances of a design block at different locations within an integrated circuit, wherein each of the multiple instances of the design block comprises: at least one modifiable periphery section adjacent to a periphery of the design block; and a primary input,
    wherein primary inputs of the multiple instances of the design block are connected by corresponding data signal pathways, respectively, to logic for receiving a signal, and
    wherein, due to the different locations, at least some of the corresponding data signal pathways are configured differently;
  determining, by the processor, arrival times of the signal at the primary inputs of all of the multiple instances of the design block, respectively;

modifying, by the processor, the modifiable periphery section of each specific instance of the design block having an arrival time equal to or less than a preselected threshold arrival time in order to generate an updated integrated circuit design, the modifying being performed to reduce any of power consumption by the specific instance of the design block and an area of the specific instance of the design block, and the modifying comprising performing any of the following with respect to at least one device within the modifiable periphery section of the specific instance of the design block:

bypassing;
restructuring by changing device type; and,
restructuring by changing device size; and after the modifying, generating a final integrated circuit design layout, the final integrated circuit design layout being at least one of area-optimized and power-optimized and further being used for manufacturing integrated circuits.

2. The method of claim 1, the modifying being performed such that a positive slack associated with the specific instance of the design block is reduced.

3. The method of claim 1, the modifiable periphery section being between a primary input and an initial flipflop of a signal pathway.

4. The method of claim 1, the modifiable periphery section being between a last flipflop and a primary output of a signal pathway.

5. The method of claim 1, the modifiable periphery section being between a primary input and a primary output of a signal pathway that is devoid of flipflops.

6. The method of claim 1, further comprising, after the modifying:

receiving, by the processor, a notification of a modification to the design block; and, when the modification to the design block only contains a change to the modifiable periphery section, only reassessing any previously made modifications to the modifiable periphery section of any of the multiple instances of the design block.

7. A system comprising:

a memory storing an integrated circuit design comprising multiple instances of a design block, each of the multiple instances of the design block at different locations within an integrated circuit, wherein each of the multiple instances of the design block comprises at least one modifiable periphery section adjacent to a periphery of the design block and a primary input, wherein primary inputs of the multiple instances of the design block are connected by corresponding data signal pathways, respectively, to logic for receiving a signal, and wherein, due to the different locations, at least some of the corresponding data signal pathways are configured differently; and, at least one processor in communication with the memory, the processor accessing the integrated circuit design and determining arrival times of the signal at the primary inputs of all of the multiple instances of the design block, respectively, the processor further modifying the modifiable periphery section of each specific instance of the design block having an arrival time equal to or less than a preselected threshold arrival time in order to generate an updated integrated circuit design, and the modifying being performed by the processor to reduce any of power consumption by the specific instance of the design block and an area of the specific instance of the design block, and the modifying comprising performing any of the following with respect to at least one device within the modifiable periphery section of the specific instance of the design block:

bypassing;
restructuring by changing device type; and,
restructuring by changing device size; and the processor further generating a final integrated circuit design layout after the modifying, the final integrated circuit design layout being at least one of area-optimized and power-optimized and further being used for manufacturing integrated circuits.

8. The system of claim 7, the processor modifying the modifiable periphery section of a specific instance of the design block such that a positive slack associated with the specific instance of the design block is reduced.

9. The system of claim 7, the modifiable periphery section being between a primary input and an initial flipflop of a signal pathway.

10. The system of claim 7, the modifiable periphery section being between a last flipflop and a primary output of a signal pathway.

11. The system of claim 7, the modifiable periphery section being between a primary input and a primary output of a signal pathway that is devoid of flipflops.

12. The system of claim 7, the processor further receiving a notification of a modification to the design block and only reassessing any previously made modifications to the modifiable periphery section of any of the multiple instances of the design block, when the modification to the design block only contain a change to the modifiable periphery section.

13. A computer program product for integrated circuit design, the computer program product comprising a computer readable storage medium having program instructions stored thereon, the program instructions being executable by a processor to cause the processor to perform a method, the method comprising:

accessing, from a memory, an integrated circuit design comprising multiple instances of a design block at different locations within an integrated circuit, wherein each of the multiple instances of the design block comprises at least one modifiable periphery section adjacent to a periphery of the design block and a primary input, wherein primary inputs of the multiple instances of the design block are connected by corresponding data signal pathways, respectively, to logic for receiving a signal, and wherein, due to the different locations, at least some of the corresponding data signal pathways are configured differently;

determining arrival times of the signal at the primary inputs of all of the multiple instances of the design block, respectively;

modifying the modifiable periphery section of each specific instance of the design block having an arrival time equal to or less than a preselected threshold arrival time in order to generate an updated integrated circuit design, the modifying being performed to reduce any of power consumption by the specific instance of the design block and an area of the specific instance of the design block, and the modifying comprising performing any of the following with respect to at least one device within the modifiable periphery section of the specific instance of the design block:

bypassing;

restructuring by changing device type; and, restructuring by changing device size; and after the modifying, generating a final integrated circuit design layout, the final integrated circuit design layout being at least one of area-optimized and power-optimized and further being used for manufacturing integrated circuits.

14. The computer program product of claim 13, the method further comprising, after the modifying:

receiving, by the processor, a notification of a modification to the design block; and, when the modification to the design block only contains a change to the modifiable periphery section, only reassessing any previously made modifications to the modifiable periphery section of any of the multiple instances of the design block.

* * * * *